United States Patent [19]
Sato et al.

[11] Patent Number: 4,959,732
[45] Date of Patent: Sep. 25, 1990

[54] STILL VIDEO SIGNAL PLAYBACK APPARATUS FOR CONVERTING AN INPUT VIDEO SIGNAL INTO A NOISE CANCELLED, DROP-OUT COMPENSATED PLAYBACK SIGNAL

[75] Inventors: Akio Sato; Kazuo Okada, both of Tokyo, Japan

[73] Assignee: Fuji Photo Film Co., Ltd., Kanagawa, Japan

[21] Appl. No.: 277,327

[22] Filed: Nov. 29, 1988

[30] Foreign Application Priority Data

Nov. 30, 1987 [JP]  Japan ................................. 62-300064

[51] Int. Cl.⁵ .............................................. H04N 5/94
[52] U.S. Cl. .................................... 358/336; 360/38.1
[58] Field of Search ............... 358/312, 314, 336, 340; 360/10.1, 38.1, 35.1

[56] References Cited

U.S. PATENT DOCUMENTS

| 4,605,951 | 8/1986 | Kuribayashi | 358/313 |
| 4,677,487 | 6/1987 | Tomita et al. | 388/336 |
| 4,691,249 | 9/1987 | Acello | 358/336 |
| 4,737,862 | 4/1988 | Koga | 358/314 |
| 4,772,975 | 9/1988 | Azuma | 358/336 |
| 4,783,703 | 11/1988 | Murakoshi et al. | 358/336 |

Primary Examiner—Robert L. Richardson

[57] ABSTRACT

A still video signal playback apparatus in which common circuit components are employed so as to be shared among a drop-out compensator circuit, a noise cancel circuit, and an arithmetic mean circuit, thereby simplifying circuit configuration. Furthermore, three functions including the drop-out compensation, the noise cancellation, and the arithmetic means computation are provided.

16 Claims, 4 Drawing Sheets

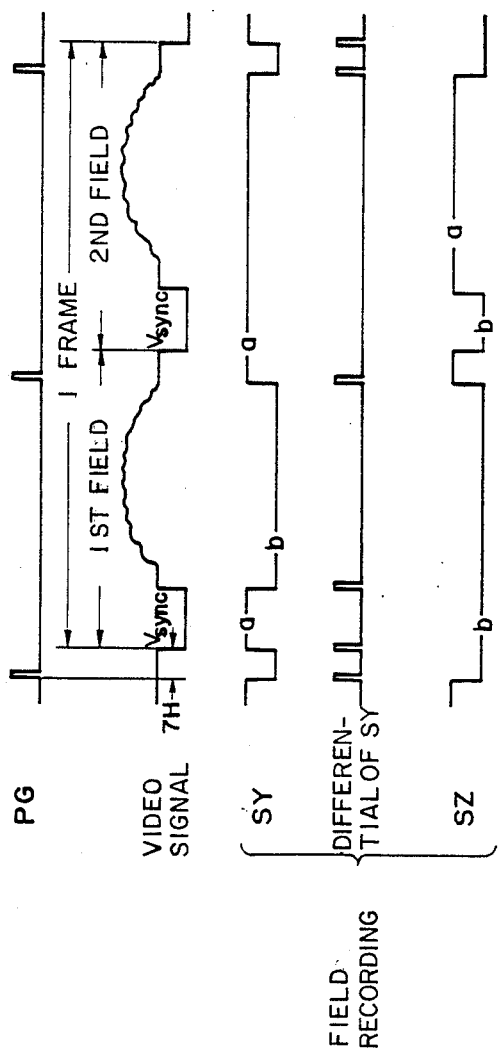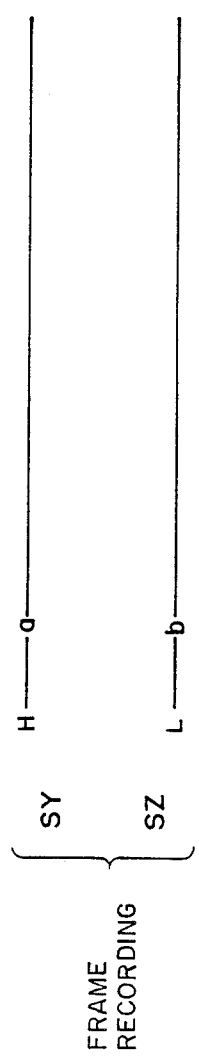

STILL VIDEO SIGNAL PLAYBACK APPARATUS FOR CONVERTING AN INPUT VIDEO SIGNAL INTO A NOISE CANCELLED, DROP-OUT COMPENSATED PLAYBACK SIGNAL

BACKGROUND OF THE INVENTION

The present invention relates to a still video signal playback apparatus.

A still video signal of an image shot by use of a camera such as a still video camera, or a still video signal supplied from a television system, is magnetically recorded on a video floppy disk such that a field of still video signals are written on each track of the floppy disk. A recording manner in which a field of video signals are recorded for each image is called a field recording, whereas a recording operation in which two fields (i.e. one frame) of video signals are written in two tracks for recording an image is caed a frame recording.

In the color system of the National Television Systems Committee (NTSC), a screen image (or one frame) is produced through an interlaced scanning effected on two-field signals. In a case of a frame recording, since two fields of video signals are recorded, there does not arise any particular trouble; however, for a still video signal processed in the field recording operation, it is necessary to convert the signal into a signal suitable for the interlaced scanning for the playback and display thereof. This signal conversion is effected by a field/frame conversion circuit. A signal read from a video floppy disk is used as a first (or second) field signal, whereas a second (or a first) field signal is produced by delaying 0.5H (H stands for a horizontal scanning period) the signal read from the video floppy disk in the conversion circuit above.

In the interlaced playback operation of the field signal described above, on horizontal scanning lines where the first and second fields are adjacent to each other, there appears an image associated with the same video signal, which causes the playback image to be shifted upward and downward in some cases. To overcome this difficulty, there has been employed a method in which in one of the fields, an image of each horizontal scanning line is represented with a video signal which is attained as an arithmetic means of a video signal associated with the horizontal scanning line and a video signal related to a preceding horizonal scanning line previous thereto.

On the other hand, in a still video signal playback apparatus, there are disposed various circuits for improving the quality of the visualized playback image such as a noise cancel circuit to remove a high-frequency noise signal contained in the video signal and a drop-out compensator circuit to compensate for a space or blank portion appearing in the screen when a portion of the video signal is lost (i.e. a drop-out takes place) because of, for example, a recording failure or a read error.

SUMMARY OF THE INVENTION

It is therefore an obJect of the present invention to provide a still video signal playback apparatus with a simplified configuration of circuits having a plurality of different functions such as an arithmetic mean circuit, a noise cancel circuit, and a drop-out compensator circuit, which is achieved by determining which circuit elements are common therebetween and by employing such common elements to be shared among these circuits.

The still video signal playback apparatus according to the present invention includes a drop-out compensator circuit, a noise cancel circuit, and an arithmetic mean circuit.

The drop-out compensator circuit comprises a 1H delay circuit for delaying an input video signal by a time period identical to one horizontal scanning period and a first change-over switch which ordinarily selects the input video signal so as to output the signal and which selects, when a drop-out is detected, an output signal from the 1H delay circuit in response to the detection of the drop-out so as to output the signal.

The noise cancel circuit includes a first arithmetic circuit for obtaining a difference between the input video signal and the output signal from the 1H delay circuit, a noise component extract circuit for extracting a noise component from an output signal supplied from the first arithmetic circuit, a second change-over switch for selecting either one of the output signal from the first arithmetic circuit or the output signal from the noise component extract circuit depending on whether the recording operation was a field recording or a frame recording or depending on whether the field is the first field or the second field in the interlaced scanning of the field recording, attenuator means for attenuating the output signal from the first arithmetic circuit and the output signal from the noise component extract circuit according to a predetermined ratio, and a second arithmetic circuit for subtracting the output signal from the second change-over switch from the input video signal.

The arithmetic mean circuit includes the 1H delay circuit, the first arithmetic circuit, a portion of said attenuator means for attenuating at least the output signal from said first arithmetic unit, the second change-over switch in a state where the first arithmetic circuit is selected, and the second arithmetic circuit.

As described above, in the still video signal playback circuit according to the present invention, many components are shared among the drop-out compensator circuit, the noise cancel circuit, and the arithmeic means circuit, and hence the circuit constitution can be simplified. In addition, three functions including the drop-out compensation, the noise cancellation, and the arithmetic mean computation are provided.

BRIEF DESCRIPTION OF THE DRAWINGS

The present invention will be apparent from the following detailed description taken in conjunction with the accompanying drawings in which:

FIGS. 2a and 2b are signal timing charts of the change-over control signal associated with the field recording and the frame recording, respectively;

DESCRIPTION OF THE PREFERRED EMBODIMENTS

Figure 1:
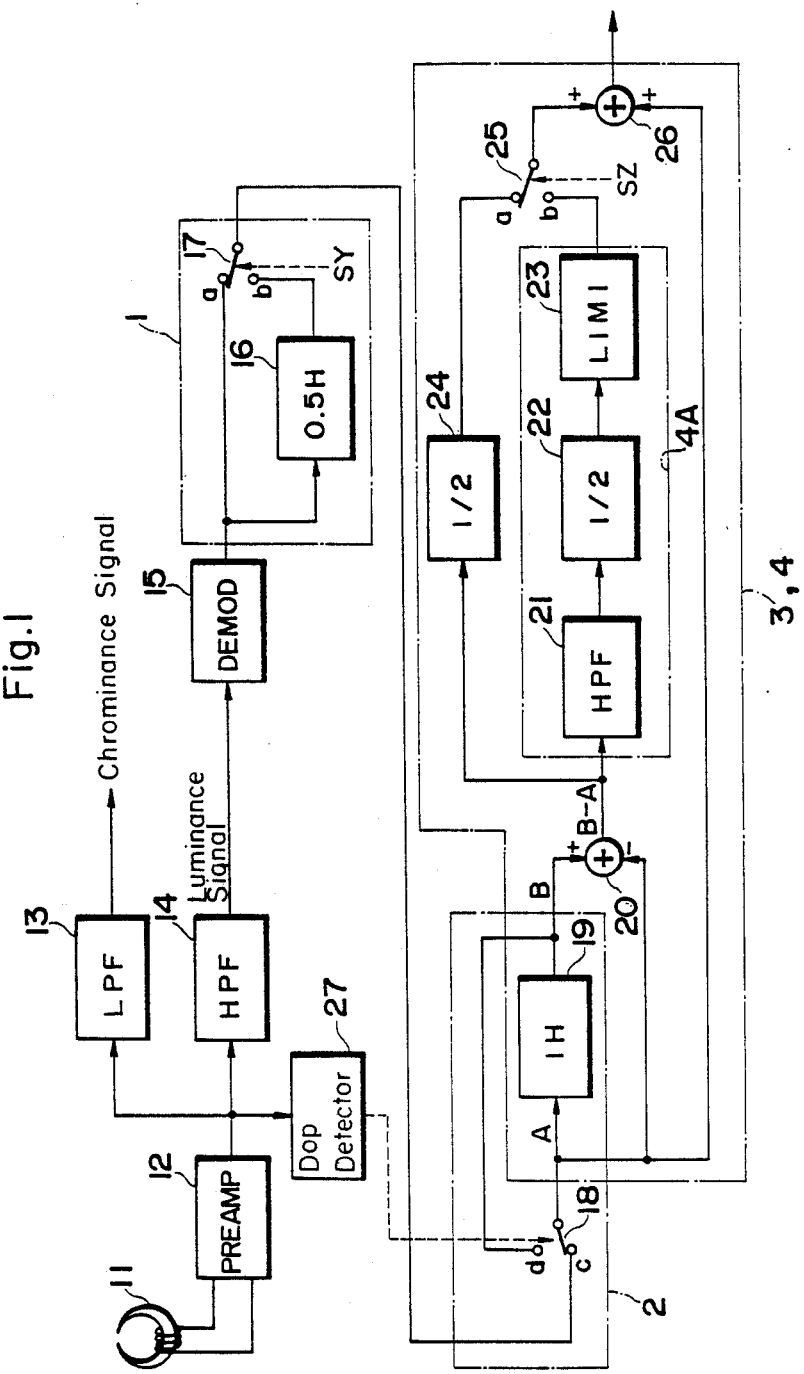
FIG. 1 is a block diagram schematically showing an embodiment according to the present invention.

FIG. 1 shows the circuit configuration of an embodiment according to the present invention.

A still video signal read from a video floppy disk (not shown) by means of a magnetic playback head or a magnetic head 11 is amplified by a preamplifier circuit 12 so as to be respectively supplied to a low-pass filter 13 and a high-pass filter 14, thereby obtaining the separated chrominance and luminance signals, respectively. The luminance signal undergoes a frequency demodulation in a demodulation circuit 15 and the resultant signal is fed to a field/frame conversion circuit 1. The chrominance signal is delivered to a processing circuit (not shown) so as to undergo therein field/frame conversion, demodulation, and processing to synchronize or to adjust the timing.

The field/frame conversion circuit 1 includes a delay circuit 16 for delaying 0.5H the demodulated still video signal and a change-over switch 17 for selecting either one of the demodulated video signal (to be referred to as a through video signal herebelow) or the video signal which has undergone the 0.5H delay operation (to be referred to as a 0.5H delay video signal herebelow). The change-over operation of the change-over switch 17 is controlled by a change-over control Signal SY.

FIGS. 2a and 2b show the change-over timing of the switch 17 in association with the change-over control signal SY. More concretely, FIGS. 2a and 2b correspond to the still video signals of the field and frame recording operations, respectively. These timing charts also show the change-over timing associated with a second change-over control signal SZ supplied to a change-over switch 25 disposed to attain an arithmetic mean, which will be described later.

In FIG. 2a, a phase detection pulse PG represents a rotation phase of the video floppy disk and is generated from a phase detector (not shown) each time a predetermined angle position of the video floppy disk is detected once for each rotation thereof. A vertical synchronization signal Vsync in the video signal is synchronized with the pulse PG so as to be generated with a delay of 7H with respect to the pulse PG. In the playback of signals of the field recording, the signal SY is produced for the change-over operation such that the change-over switch 17 is connected to the side b in the first field scanning period of the interlaced scanning operation (the signal SY is at an L level, for example) so as to output the 0.5 H delay video signal from the conversion circuit 1, and then the switch 17 is connected to the side a in the following second field scanning period (the signal SY is at an H level) so as to output the through video signal. In the first field period, in order to prevent the 0.5H delay of the vertical synchronization signal Vsync, the signal SY is set to the H level so as to change over the switch 17 to the side a only during the period of the vertical sync signal Vsync.

Referring now to FIG. 2b, for the video signal processed in the frame recording operation, the change-over switch 17 is kept connected to the side a (the signal SY is at the H level).

The output signal from the field/frame conversion circuit 1 is then delivered via the change-over switch 18 of the drop-out compensator circuit 2 to the 1H delay circuit 19. Although the compensator circuit 2 will be described later, for convenience of description, it is assumed that the change-over switch 18 is connected to the side c so that the output video signal from the field/frame conversion circuit 1 is directly supplied to the 1H delay circuit 19.

The input video signal supplied to the 1H delay circuit 19 is denoted by A, whereas the video signal outputted from this delay circuit 19 with a 1H delay is designated by B. Since an adder (which may be substantially referred to as a subtractor) 20 is supplied with the signal B delayed by 1H on the positive side and with the signal A on the negative side, thereby effecting an arithmetic operation of B - A. The signal A is shifted from the signal B by one horizontal scanning period. That is, an image associated with the signal A is shifted from an image related to the signal B by a horizontal scanning line. In general, since a strong correlation exists along the vertical direction in the image, the signal A is considered than be quite similar to the signal B. The difference signal component between the signals A and B includes a signal component representing a fine portion of the image and a random noise (there does not exists a correlation with respect to the random noise), which are represented by the signal B - A.

The signal B - A is delivered on one hand to a high-pass filter 21 to pass the noise component (the noise component has a high frequency in general) and is then supplied to an attenuator 22 which attenuates the amplitude of the signal to half the original value (−6dB). In addition, the resultant signal is fed to a limiter 23 having a limit level L1 such that an image signal component having a relatively large amplitude is removed so as to deliver only a noise component having a relatively small amplitude to the terminal on the side b of the change-over switch 25. The signal component appearing at the terminal b includes substantially only the noise component of the signal B - A. However, the limiter 23 need not be necessarily disposed in the circuit configuration.

The output from the change-over switch 25 and the signal A are supplied to an adder 26. Referring now to FIG. 2a, for the first field in the playback operation according to the field recording, the change-over switch 25 is connected to the side b by use of the change-over control signal SZ (at the L level). In this situation, since the change-over switch 17 is also connected to the side b in the pertinent period, except for the period associated with the vertical sync signal, the signal A is the 0.5H delay video signal. Since the signal A and the noise component of the signal B - A are fed to the adder 26, the noise component of the signal A (the noise component of the signal B - A contains the noise component of the signal A in the form of a negative value) is removed in the adder 26 (i.e. the noise cancellation is effected).

The output signal B - A from the adder 20 is on the other hand delivered to an attenuator 24 attenuating the amplitude of the signal to half the original value. For the second field in the playback processing associated with the field recording, the change-over switch 25 is connected to the side a by use of the control signal SZ (at the H level) so as to supply in this situation a signal of (B - A)/2 to the adder 26; in consequence, the adder 26 achieves an arithmetic operation: A+(B - A)/2 =(A+B)/2. Namely, an arithmetic mean computation is conducted. In this case, as described above, the signal A is the through video signal. In the arithmetic mean processing, since the noise component is also subjected to the averaging operation, the noise cancellation is also substantially effected. When the arithmetic mean processing is effected on the vertical sync signal Vsync, the edge thereof is smoothed. To avoid this disadvantageous feature, the signal SZ is set to the L level only during the period of the vertical sync signal associated with the second field so as to connect the change-over switch 25 to the side b.

Referring now to FIG. 2b, for the video signal processed in the frame recording, the change-over control signal SZ is at the L level and hence the change-over switch 25 is connected to the side b, thereby effecting the noise cancel processing.

In summary, for the still video signal processed in the field recording, the switches 17 and 25 are connected to the side b during the period of the first field; in consequence, there is attained the 0.5H delay video signal which has undergone a noise cancel processing having a high noise suppression effect, except the vertical sync signal. Furthermore, for the period of the second field, the switches 17 and 25 are connected to the side a so as to achieve the arithmetic mean processing, which as a result produces the through video signal which has substantially undergone the noise cancellation.

For the video signal processing of the frame recording, only the noise cancellation is effected.

In FIG. 1, the 1H delay circuit 19, the adder 20, the high-pass filter 21, the attenuator 22, the limiter 23, the attenuator 24, the change-over switch 25, and the adder 26 constitute the noise cancel circuit 3. Of the components configuring the noise cancel circuit 3, the components other than the high-pass filter 21, the attenuator 22, and the limiter 23 (enclosed with the dotted line 4A) constitute the arithmetic mean circuit 4.

The same result is obtained by effecting the arithmetic operation A - B in the adder 20 and by subtracting the output from the change-over switch 25 from the signal A by use of the adder 26.

The 1H delay circuit 19 is also shared by the drop-out compensator circuit 2. The output from the 1H delay circuit 19 is supplied to the side d of the change-over switch 18. The change-over switch 18 is ordinarily connected to the side c such that the video signal outputted from the field/frame conversion circuit 1 is supplied to the noise cancel and arithmetic mean circuit 3, 4.

An event of a drop out in which a portion of the video signal is lost is detected by the known drop-out detect circuit 27. When a drop-out is detected, the change-over switch 18 is changed over to the side d during the period of the drop-out such that the output signal from the 1H delay circuit 19 is supplied to the noise cancel and arithmetic mean circuit 3, 4. In this manner, in a case of a partial defect of the video signal on a horizontal scanning line, the video signal at the corresponding location in the preceding horizontal scanning line is supplied so as to compensate for the defective portion of the display image. When the drop-out compensation is taking place, the same signal appears as the input and output signals A and B of the 1H delay circuit 19; in consequence, the noise cancellation and the arithmetic mean computation are not processed.

Figure 3:
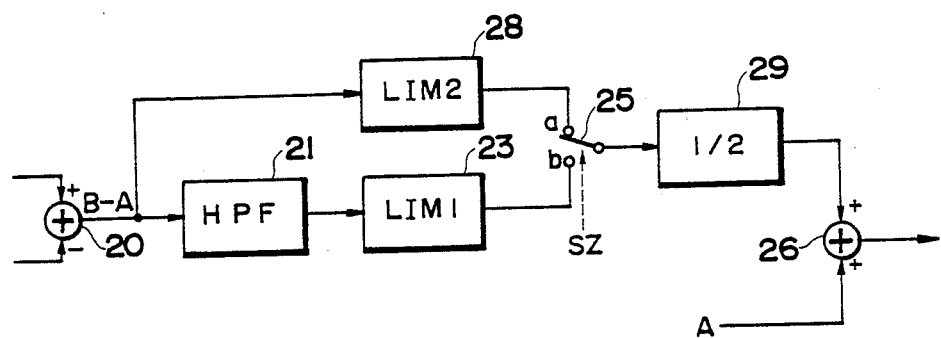
FIG. 3 is a schematic block diagram showing a variation of the circuit configuration of the embodiment shown in FIG. 1.
Figure 4:
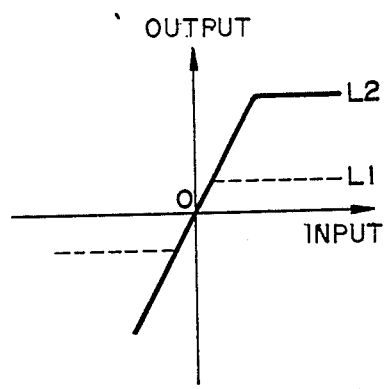
FIG. 4 is a graph showing a limit level of a limiter.

FIG. 3 shows an alternative embodiment according to the present invention. This figure particularly shows the portion of the noise cancel and arithmetic mean circuit 3, 4. For the circuit to be connected on the side of a of the change-over switch 25, there is disposed a limiter 28 having a limit level L2 higher than a limit level L1 of a limiter 23 as shown in FIG. 4, thereby suppressing the signal B - A. In addition, for simplification of the circuit configuration, the two attenuators 22 and 24 are replaced with an attenuator 29 connected on the output side of the change-over switch 25.

In this constitution, in a large amplitude range, the output signal from the adder 26 does not strictly become to be $(A/2)+(B/2)$. Namely, $(A/\alpha)+(B/\beta)$ results, where $\alpha<\beta$, which means that the signal component A is emphasized. It is assumed the processing above is also included in the concept of the arithmetic mean processing.

Figure 5:
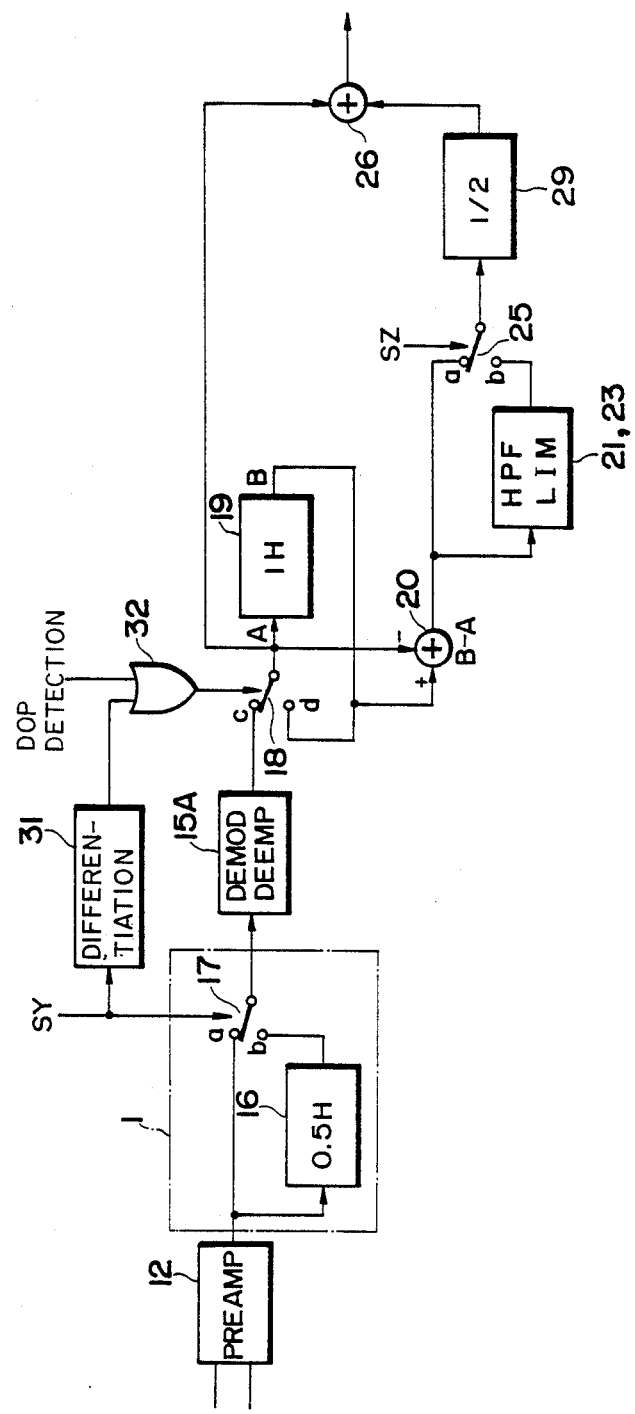
FIG. 5 is a block diagram schematically showing an alternative embodiment according to the present invention.

FIG. 5 shows a further alternative embodiment according to the present invention. When a demodulated video signal is passed to a 0.5H delay circuit 16, there occurs an attenuation of the amplitude of the signal, which may possibly cause a flicker in the playback image due to the difference of the luminance between the through video signal and the 0.5H delay video signal. In order to avoid the occurrence of this problem, the circuit configuration of FIG. 5 includes a field/frame change-over circuit 1 disposed in a stage prior to a demodulation circuit (which includes a de-emphasis circuit) 15A. In addition, in order to remove the discontinuity of the signal appearing in a change-over operation of the change-over switch 17, the differentiation circuit 31 produces a differentiated signal from the change-over control signal SY (FIG. 2a), which is then delivered via an OR circuit 32 to the change-over switch 18 so as to temporarily connect the change-over switch 18 to the side d.

The invention being thus described, it will be obvious that the same may be varied in many ways. Such variations are not to be regarded as a departure from the spirit and scope of the invention, and all such modifications as would be obvious to one skilled in the art are intended to be inclined within the scope of the following claims.

What is claimed is:

1. A still video signal playback apparatus for converting a video signal, recorded via field recording to frame recording, into a playback signal comprising:
   drop-out detector means, coupled to the video signal, for outputting a drop-out detection signal when a drop-out is detected;
   drop-out compensator means including
      first switch means, coupled to the video signal, for providing a first switch output signal, and
      1H delay means, wherein H refers to a horizontal scanning period, for delaying said first switch output signal by a period of 1H and for outputting a first delayed signal,
      said first switch means outputting as said first switch output signal said first delayed signal in response to said drop-out detection signal and the video signal otherwise; and noise cancellation means including
      first arithmetic means for subtracting said first switch output signal from said first delayed signal to output a first difference signal,
      noise component extract means, coupled to said first difference signal, for extracting and outputting a noise component signal from said first difference signal,
      attenuator means, coupled to and attenuating said first difference signal and said noise component signal according to a predetermined ratio, to output an attenuated first difference signal,
      second switch means, coupled to and selectively outputting as a second switch output signal, said attenuated first difference signal or said attenuated noise component signal based on whether the video signal was recorded via field recording or frame recording, and second arithmetic means, coupled to and adding said first switch output signal and said second switch output signal to output the playback signal.

2. A still video signal playback apparatus in accordance with claim 1 further comprising:

field/frame conversion means, coupled to an output video signal, for generating from said input video signal recorded via field recording a signal of a first field and a second field in an interlaced scanning operation as an output and for outputting said input video signal when said input video signal is recorded via frame recording, said field/frame conversion means output coupled to said drop-out compensator means as the video signal, and including 0.5H delay means for delaying the input video signal by a period of 0.5H, and third switch means, coupled to said input video signal and said delayed input video signal, for outputting said input video signal or said delayed input video signal as said field/frame conversion means output signal in accordance with whether said input video signal was recorded via field recording or frame recording.

3. A still video playback apparatus in accordance with claim further comprising a frequency demodulator, coupled to the input video signal prior to the field/frame conversion means, for demodulating the input video signal and for outputting the demodulated input video signal to the field/frame conversion means as the input video signal.

4. A still video signal playback apparatus for converting a video signal recorded via field recording or frame recording into a playback signal comprising:

drop-out detector means, coupled to the video signal, for outputting a drop-out detection signal when a drop-out is detected;

drop-out compensator means including first switch means, coupled to the video signal, for providing a first switch output signal, and 1H delay means, wherein H refers to a horizontal scanning period, for delaying said first switch output signal by a period of 1H and for outputting a first delayed signal, said first switch means outputting as said first switch output signal said first delayed signal in response to said drop-out detection signal and the video signal otherwise; and noise cancellation means including first arithmetic means for subtracting said first switch output signal from said first delayed signal to output a first difference signal, noise component extract means, coupled to said first difference signal, for extracting and outputting a noise component signal from said first difference signal, first limiting means, coupled to and limiting said first difference signal, according to a first limit level, to output a limited first difference signal, second switch means, coupled to and selectively outputting as a second switch output signal said limited first difference signal or said noise component signal based on whether the video signal was recorded via field recording or frame recording, attenuator means, coupled to said second switch output signal, for attenuating said second switch output signal in accordance with a predetermined attenuation factor to output an attenuated second switch output signal, and second arithmetic means, coupled to and adding said first switch output signal and said second switch output signal to output the playback signal.

5. A still video signal playback apparatus in accordance with claim 4 further comprising:

field/frame conversion means, coupled to an input video signal, for generating from said input video signal recorded via field recording a signal of a first field and a second field in an interlaced scanning operation as an output and for outputting said input video signal when said input video signal is recorded via frame recording, said field/frame conversion means output coupled to said drop-out compensator means as the video signal, and including 0.5H delay means for delaying the input video signal by a period of 0.5H, and third switch means, coupled to said input video signal and said delayed input video signal, for outputting said input video signal or said delayed input video signal as said field/frame conversion means output signal in accordance with whether said input video signal was recorded via field recording or frame recording.

6. A still video playback apparatus in accordance with claim 4 further comprising a frequency demodulator, coupled to the input video signal prior to the field/frame conversion means, for demodulating the input video signal and for outputting the demodulated input video signal to the field/frame conversion means as the input video signal.

7. A still video signal playback apparatus in accordance with claim 4 wherein said noise component extract means comprises:

high-pass filter means, coupled to and extracting a noise signal from said first difference signal, and second limiting means, coupled to said noise signal, for removing a signal component from said noise signal according to a second limit level in order to output said noise component signal, said signal component having a large amplitude and said second limit level being greater than said first limit level.

8. A still video signal playback apparatus for converting an input video signal recorded via field recording or frame recording into a playback signal comprising:

field/frame conversion means, coupled to the input video signal for generating from said input video signal recorded via field recording a signal of a first field and a second field in an interlaced scanning operation as an output and for outputting said input video signal when said input video signal is recorded via frame recording, including 0.5 H delay means, wherein H refers to a horizontal scanning period, for delaying the input video signal by a period of 0.5 H, and first switch means, coupled to said input video signal and said delayed input video signal, for outputting said input video signal or said delayed input video signal as said field/frame conversion means output signal in accordance with a first control signal indicative of whether said input video signal waas recorded via field recording or frame recording;

demodulator means, coupled to and frequency demodulating said field/frame conversion means output signal in order to output a video signal;

drop-out detector means, coupled to said input video signal, for outputting a drop-out detection signal when a drop-out is detected;

drop-out compensator means including
second switch means, coupled to the video signal, for providing a second switch output signal, and
1 H delay means, for delaying said second switch output signal by a period of 1 H and for outputting a first delayed signal,
said second switch means outputting as said second switch output signal said first delayed signal in response to said drop-out detection signal and the video signal otherwise; and noise cancellation means including
first arithmetic means for subtracting said second switch output signal from said first delayed signal to output a first difference signal,
noise component extract means, coupled to said first difference signal, for extracting and outputting a noise component signal from said first difference signal,
third switch means, coupled to and selectively outputting as a third switch output signal said second switch output signal or said noise component signal in accordance with a second control signal indicative of whether said input video signal was recorded via field recording or frame recording,
attenuator means, coupled to and attenuating said
third switch output signal in accordance with a predetermined attenuator factor to output an attenuated third switch output signal, and
second arithmetic means, coupled to and adding said second switch output signal and said attenuated third switch output signal to output the playback signal.

9. A still video playback apparatus in accordance with claim 8 further comprising:
differentiation means, coupled to and differentiating said first control signal to provide as output a differentiated first control signal, and
OR-gate means, coupled to said differentiated first control signal and said drop-out detection signal, for outputting a change-over switching signal to control said second switch means.

10. A still video signal playback apparatus in accordance with claim 8 wherein said noise component extract means comprises:
high-pass filter means, coupled to and extracting a noise signal from said first difference signal, and
first limiting means, coupled to said noise signal, for removing a signal component from said noise signal according to a first limit level in order to output said noise component signal.

11. A still video signal playback apparatus for converting a video signal recorded via field recording or frame recording into a playback signal and an arithmetic means signal comprising:

drop-out detection means coupled to the video signal, for outputting a drop-out detection signal when a drop-out is detected;

drop-out compensator means including a 1H delay circuit, wherein H represents a horizontal scanning period, for delaying the input video signal by a period of 1H and a first change-over switch for ordinarily selecting and outputting the video signal and for selecting and outputting, in response to said drop-out detection signal, an output signal from said 1H delay circuit in response to said drop-out detection;

noise cancel means including a first arithmetic circuit for obtaining a difference between the video signal and an output signal from said 1H delay circuit, a noise component extract circuit for extracting a noise component from an output signal supplied from said first arithmetic circuit, a second change-over switch for selecting either one of said output signal from said first arithmetic circuit or an output signal from said noise component extract circuit depending on whether a signal recording was effected in a field recording or frame recording or whether an objective field is a first field or a second field in an interlaced scanning for a field recording operation, attenuator means for attenuating said output signal from said first arithmetic circuit and said output signal from said noise component extract circuit according to a predetermined ratio, and a second arithmetic circuit for subtracting an output signal from said second change-over switch from the video signal to provide as output the playback signal,
said 1H delay circuit, said first arithmetic circuit, a portion of said attenuator means for attenuating at least the output signal from said first arithmetic circuit, said second change-over switch in a state where said first arithmetic circuit is selected, and said second arithmetic circuit operate to provide as output the arithmetic mean signal.

12. A still video signal playback apparatus in accordance with claim 11 wherein said noise component extract circuit includes a high-pass filter.

13. A still video signal playback apparatus in accordance with claim 11, wherein said attenuator means includes:
a first attenuator disposed in said noise component extract circuit, and
a second attenuator for attenuating the output signal from said first arithmetic circuit.

14. A still video signal playback apparatus in accordance with claim 11 wherein said noise component extract circuit includes a high-pass filter.

15. A still video signal playback apparatus in accordance with claim 11 wherein said attenuator means includes:
a first attenuator disposed in said noise component extract circuit, and
a second attenuator for attenuating said output signal from said first arithmetic circuit.

16. A still video signal playback apparatus in accordance with claim 11 further comprising:
field/frame conversion means coupled to an input video signal for generating from said input video signal recorded via field recording a signal of a first field and a second field in an interlaced scanning operation as an output and for outputting said input video signal when said input video signal is recorded via frame recording, said field/frame conversion means output coupled to said drop-out compensator means as the video signal and including 0.5H delay means for delaying the input video signal by a period of 0.5, and a third change-over switch, coupled to said input video signal and said delayed input video signal, for outputting said input video signal or said delayed input video signal as said field/frame conversion means output signal in accordance with whether said input video signal was recorded via field recording or frame recording.

* * * * *